United States Patent
Raghu

[11] Patent Number: 5,820,026
[45] Date of Patent: Oct. 13, 1998

[54] HIGH-SPEED WINDSHIELD WASHER NOZZLE SYSTEM

[75] Inventor: Surya Raghu, Columbia, Md.

[73] Assignee: Bowles Fluidics Corporation, Columbia, Md.

[21] Appl. No.: 771,764

[22] Filed: Dec. 20, 1996

[51] Int. Cl.⁶ .................................. B05B 1/10; B60J 1/02
[52] U.S. Cl. .................. 239/284.1; 239/589; 239/589.1; 15/250.01; 296/96.15
[58] Field of Search ...................... 15/250.01; 296/96.15; 239/288, 284.1, 589, 589.1

[56] References Cited

U.S. PATENT DOCUMENTS

| | | | |
|---|---|---|---|
| 3,403,859 | 10/1968 | Daansen | 15/250.01 X |
| 5,119,762 | 4/1993 | Scheele et al. | 296/96.15 X |
| 5,636,794 | 6/1997 | Hess et al. | 239/284.1 |

FOREIGN PATENT DOCUMENTS

| | | | |
|---|---|---|---|
| 102306 | 3/1984 | European Pat. Off. | 239/284.1 |
| 2035861 | 1/1972 | Germany | 239/284.1 |
| 2221522 | 11/1973 | Germany | 239/284.1 |
| 2945860 | 5/1981 | Germany | 239/284.1 |
| 195 00 349 A1 | 7/1995 | Germany . | |

Primary Examiner—Andres Kashnikow
Assistant Examiner—Robin O. Evans
Attorney, Agent, or Firm—Jim Zegeer, Esq.

[57] ABSTRACT

A windshield washer system wherein a nozzle is mounted on the hood of a vehicle and issues a jet of washer fluid in the ambient towards the windshield. The nozzle has a housing and a projecting surface, air deflector or tab formed to with or attached to the nozzle housing for aerodynamically assuring that the washer fluid impinges on the windshield in a predetermined area thereon at speeds above a predetermined minimum. In preferred embodiments, the projecting surface, air deflector or tab projects from about 6 mm to about 12 mm above the nozzle housing.

24 Claims, 4 Drawing Sheets

HIGH-SPEED WINDSHIELD WASHER NOZZLE SYSTEM

TECHNICAL FIELD

This invention relates to windshield washer systems, and in particular, to windshield washer nozzle systems having improved high-speed performance.

BACKGROUND OF THE INVENTION

Windshield washer spray systems are well known in the art. Generally, there are two main types—those in which jets of windshield washer liquid or fluid are projected in a jet stream upon the windshield and those types in which the jet of windshield washer fluid is oscillated by a fluidic oscillator so as to project a fan spray of windshield washer droplets for impingement on the windshield. In both cases, at high speed (e.g. above 55 miles per hour) the spray from the windshield washer nozzle N is affected by the air stream (air flow over the vehicle body V) and, as shown in FIG. 1, is depressed so that the windshield washer fluid impacts on the windshield W at lower and lower positions as the speed of the vehicle increases. At very high speeds, all of the windshield fluid impacts on the windshield at the lower edges of the windshield and, hence, is less effective. One solution to this problem, as disclosed in German Offenlegungsschrift DE-195 00 349 A1 is to provide dual washer jets which selectively direct the washer fluid at two different aiming angles onto the windshield or wind screen: a shallow angle for low-speed travel and a higher angle for higher speeds. In this system, two separate fluid lines connect the jets to a washer pump which provides the two pressure levels by selecting the direction of rotation of an impeller.

THE PRESENT INVENTION

The objective of the present invention is to provide an improved windshield washer nozzle system, and more particularly, to provide an improved high-speed windshield washer nozzle in which fluidic and aerodynamic effects are associated with the washer fluid nozzle in such a way as to cause the windshield washer washing liquid to impinge on the windshield more closely in the desired areas under substantially all operating conditions. The advantage of the present invention is that it is able to deposit the spray more nearly within the desired area under all operating conditions and that it is rendered effective by the higher operating speeds of the motor vehicles. According to one preferred embodiment of the invention, an air deflector is molded with the housing of the nozzle. In a further preferred embodiment, the nozzle incorporates a fluidic oscillator. In another embodiment of the invention, the air deflector is a hinged tab that is automatically lifted at high vehicle speeds either by aerodynamic forces or by other means. In all cases, the air deflectors or tabs aerodynamically generates a force which lifts the spray issuing from the nozzle at high speeds and tends to prevent or minimizes their depression away from the desired position on the windshield. It has been found that the air deflector or tab should project between about 6 mm to about 12 mm above the nozzle housing with a preferred height above the nozzle housing being about 8 mm for a fluidic oscillator nozzle causing the largest wash liquid to deposit in the desired windshield area. Moreover, the slope or concavity of the area of the nozzle housing leading up to the deflector or tab can affect the size of the separation vortex and hence the amount of wash liquid deposited in the desired areas of the windshield.

In one preferred embodiment, the windshield washer nozzle is mounted on the hood or engine cowling of the vehicle at a given fixed aiming angle to cause the wash fluid to impinge in a desired area of the windshield. The nozzle has a housing and an air deflector or tab immediately in advance of the spray as it leaves the nozzle and formed or molded with or attached to the nozzle housing. The deflector or tab produces a separation vortex which assures that the washer fluid droplets impinge on the windshield in a predetermined area at speeds above a predetermined minimum. In a preferred embodiment, the windshield washer nozzle is a fluidic nozzle that oscillates a jet of washer liquid in ambient at a rate sufficient to form washer fluid droplets which are substantially in a given droplet size range. While the preferred embodiment uses a fluidic nozzle, it will be appreciated that the invention is applicable to other types of washer nozzles. In a still further preferred embodiment, the air deflector is molded as a part of the housing and has a concave surface on the upstream side of the air deflector or tab. In a still further embodiment, the oscillator is a fluidic oscillator and includes a molded housing, and the air deflector is a member which is pivotally mounted on the housing for movement from its stowed position to an operating position by aerodynamic effects.

BRIEF DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
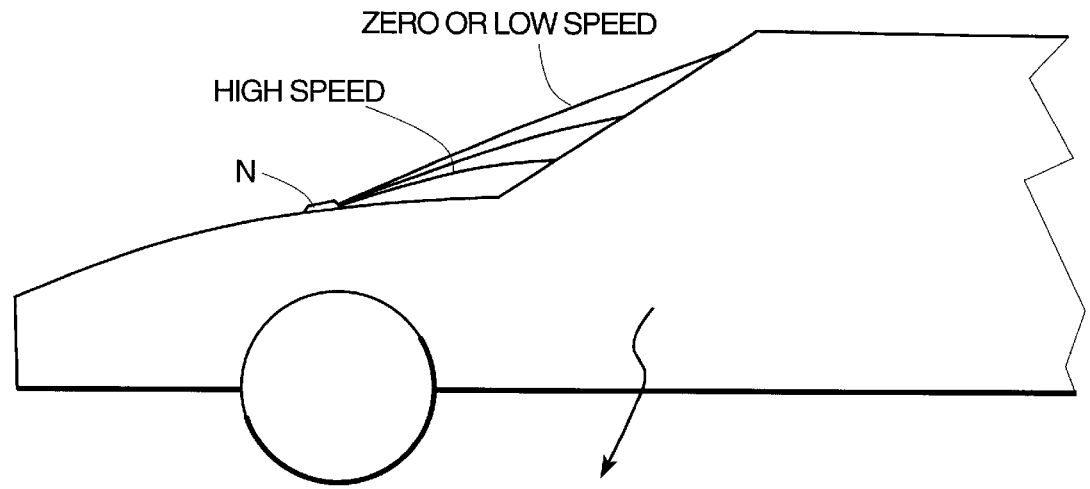
FIG. 1 is a side elevational view of a conventional windshield washer nozzle showing the depression of the washer fluid with increases in vehicle speed.
Figure 2:
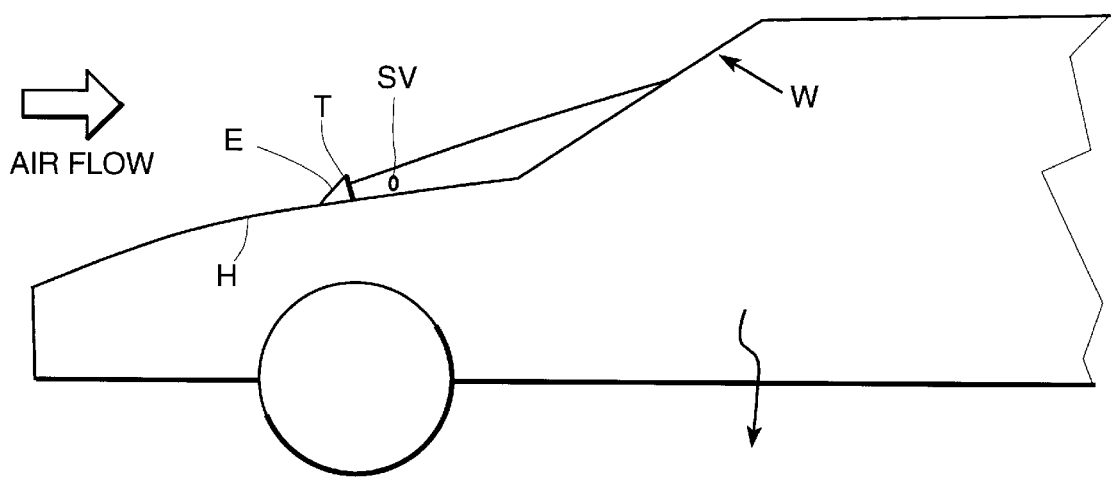
FIG. 2 is a side elevational view of a small air deflector or tab positioned on the nozzle so that the separation vortex caused by flow over on the tab deflector or lifts the liquid jet stream of washer liquid.
Figure 3:
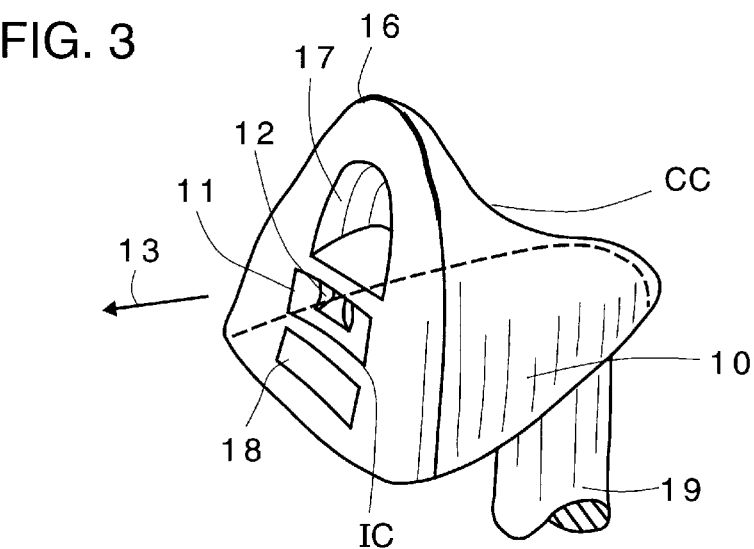
FIG. 3 is an isometric perspective view of one preferred embodiment of the invention wherein the deflector is formed as a part of the molding of the housing.

Referring now to FIG. 2, the invention is illustrated as being mounted On the hood E of a vehicle V, but other mounting locations are possible. An air deflector or tab T is mounted on the nozzle housing H so that relative air flow due to vehicle movement creates a separation vortex SV. The separation vortex SV and the uplifting force it produces on the windshield wash liquid stream or droplets is a function of vehicle speed. Thus, the lifting effect is aerodynamically induced and, within limits, the faster the vehicle travels, the greater the lifting force of the separation vortex. As shown in FIG. 3, the nozzle includes a housing 10 preferably of molded plastic having an insert 11 carrying a silhouette (not shown) for a fluidic oscillator which has an outlet 12 for issuing the jet 13 of wash fluid for projection upon a windshield or windscreen. While the invention is illustrated in connection with oscillating fluidic windshield washer nozzles, it will be appreciated that non-oscillating nozzles or non-fluidic nozzles can be used. As shown, a small tab 16 is integrally formed or positioned on the nozzle so that the air flow caused by motion of the vehicle induces the flow separation vortex which generates a force to lift the liquid stream upwards. As shown in the preferred embodiment of FIG. 3, the deflector surface is concavely CC shaped so as to cause the flow separation vortex to increase in size as a function of air flow and thereby lift the jet at high speeds.

In FIG. 3, the coring pockets 17 and 18 (which form no part of the invention) assure uniform flat surfaces in insert chamber IC for sealing when the insert 11 is inserted into the housing 10. The housing 10 in this case is used to form an integral tab or air deflector or tab 16. Washer liquid under pressure is fed via inlet 19 into the power nozzle (not shown) of fluidic insert 11 and issued as a fan spray upon the windshield. The air deflector or tab 16 is positioned on housing 10 a short distance in advance of the spray issuing from the nozzle so that the air flow forms a separation vortex which is positioned to exert a lifting force on the washer liquid. As the vehicle speed increases, within limits the lifting force increases.

Figure 4A:
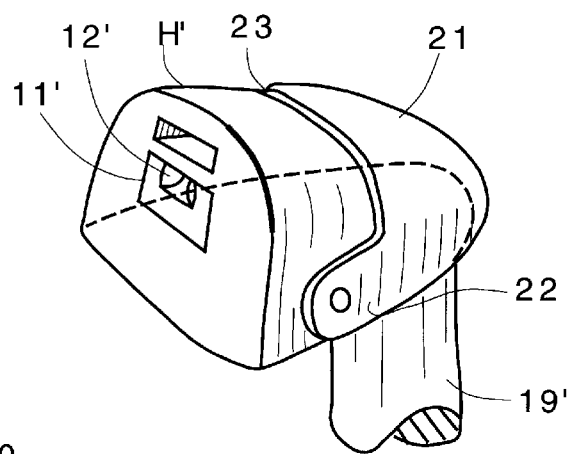
FIGS. 4A and 4B illustrate a further preferred embodiment of the invention wherein the deflector is pivoted or hinged to the housing and is lifted up at high vehicle speeds either by the aerodynamic force or other means.
Figure 4B:
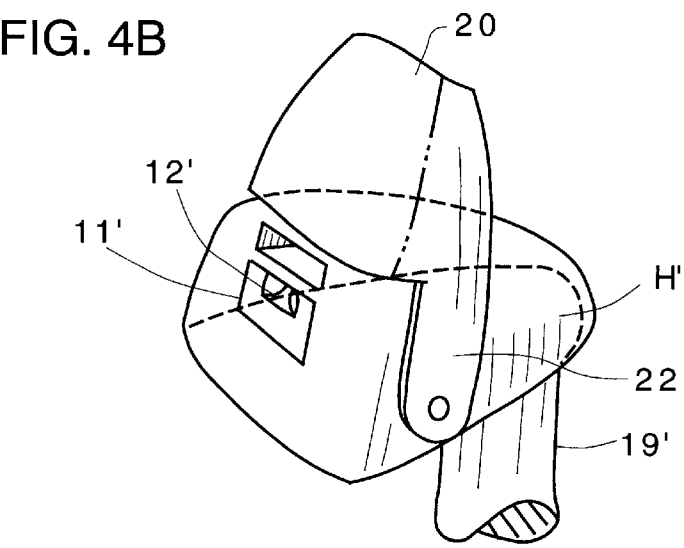

In the embodiment shown in FIGS. 4A and 4B, the deflector is a pivoted member 21 which is hinged or pivoted by depending arms 22, 23 to the housing $H^1$. The hinged air deflector or tab 21 is lifted at high vehicle speeds by aerodynamic forces. It functions the same as the stationary tabs in terms of producing a separation vortex and lifting the spray up.

Figure 5:
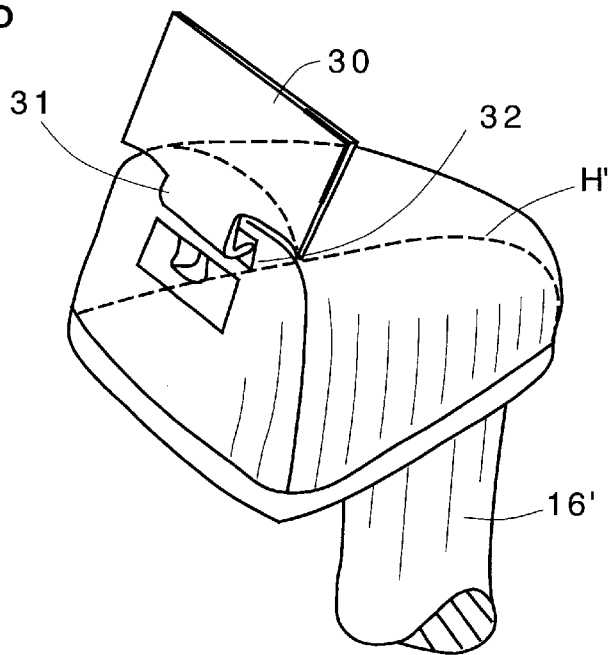
FIG. 5 is an isometric perspective view showing a further embodiment the air flow with the deflector in place.

In the embodiment shown in FIG. 5, the air deflector or tab 30 is mounted from a mounting arm 31 which has been molded in or frictionally retained in a cavity 32 in housing $H^1$.

Figure 6:
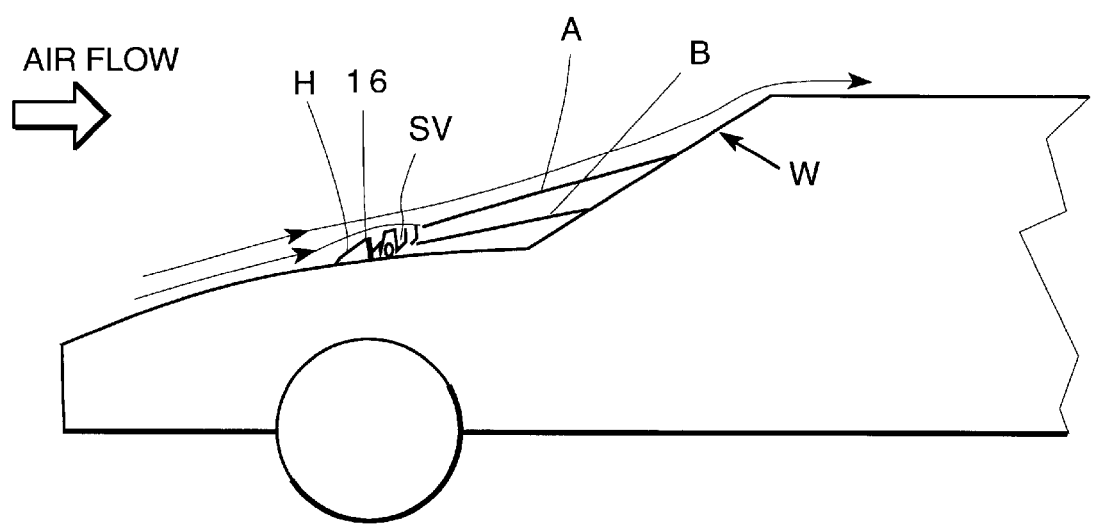
FIG. 6 is a side elevation view diagrammatically illustrating the spray trajectory at high speed with the air deflector of the invention (trajectory A) and the spray trajectory (trajectory B) at high speed without the air deflector of the invention.

FIG. 6 diagrammatically illustrates the washer fluid flow trajectory with the invention (trajectory A) and the trajectory without (trajectory B) the air deflector or tabs of the present invention.

Figure 7A:
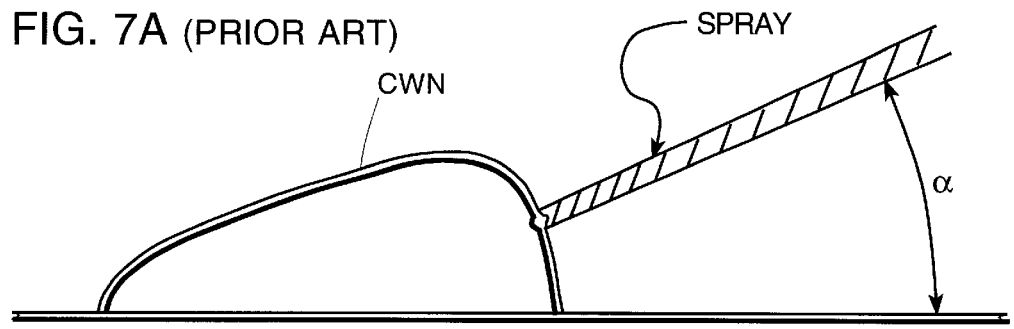
FIGS. 7A, 7B and 7C are enlarged views respectively showing (A) conventional spray showing the desired trajectory of the liquid spray, (B) showing the air flow and depression of the trajectory angle at high speed, and (C) how the air deflector creates a separation vortex at high vehicle speed which minimizes depression of the spray at high speeds causing more of the wash fluid to impinge at the desired areas of the windshield.
Figure 7B:
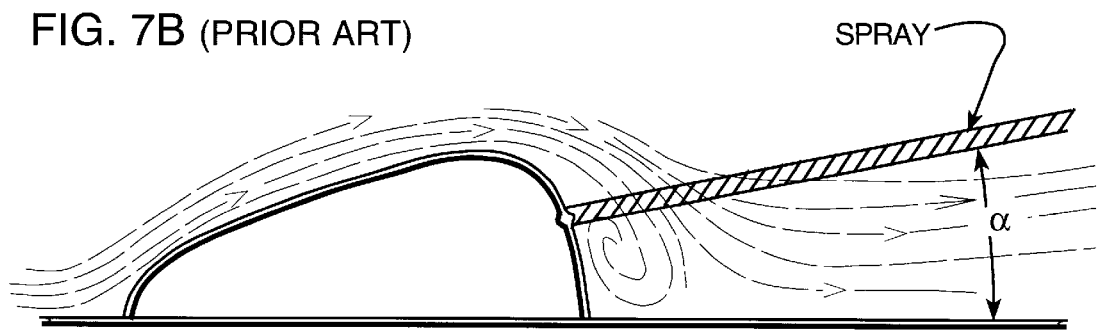
Figure 7C:
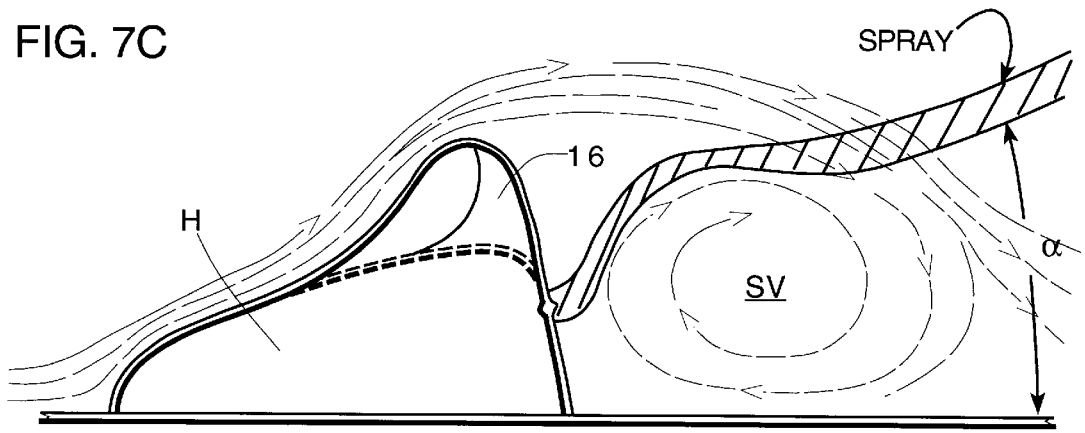

FIG. 7A illustrates the spray angle α of a conventional washer nozzle CWN and FIG. 7B diagrammatically illustrates the depression of the spray angle α caused by air flow at high speed over the nozzle. Note the small separation vortex. FIG. 7C diagrammatically illustrates the significantly larger separation vortex SV has a significant effect in preventing the depression of the spray angle α.

The advantage of the nozzle construction according to the invention is that the same spray deposits within the desired area of the windshield under substantially all operating conditions. Thus, instead of orienting the aiming angle of a nozzle so as to impact at a fixed position on the windshield, the device permits the spray angle to be adjusted to take into account the air flow effect caused by the large separation vortex caused by the air deflector just adjacent or proximate to the point of issuance of the jet from the nozzle towards the windshield. This air flow is such that the air stream caused by the movement of the vehicle at high speeds does not depress the jet or fan spray as much as the depression is at high speeds without the air deflector present.

While preferred embodiments of the invention have been illustrated and described, it will be appreciated that other embodiments, adaptations and modifications of the invention will be readily apparent to those skilled in the art.

What is claimed is:

1. In a windshield washer system wherein a nozzle is mounted on the hood of a vehicle and issues a jet of washer fluid in ambient towards the windshield, said nozzle having a housing, the improvement comprising a projection surface attached to said nozzle housing creating a separation vortex for assuring that said washer fluid impinges on said windshield in a predetermined area thereon at speeds above a predetermined minimum.

2. The windshield washer system defined in claim 1 wherein said projection surface projects from about 6 mm to about 12 mm above said nozzle housing.

3. The windshield washer system defined in claim 2 wherein said surface projects about 8 mm above said nozzle housing.

4. The windshield washer system defined in claim 1 wherein said nozzle is a fluidic oscillator nozzle which oscillates a jet of washer fluid at a rate sufficient to form washer fluid droplets substantially in a given droplet size range.

5. The windshield washer system defined in claim 4 wherein said fluidic oscillator nozzle includes a molded housing and an air deflector means molded in a surface of said molded housing.

6. The fluidic windshield washer system defined in claim 4 wherein said surface is a concave air deflector.

7. The windshield washer system defined in claim 4 wherein said fluidic oscillator includes a molded housing and said air deflector means includes means pivotally mounted on said housing for movement from a stowed position to an operative position, and means for pivotally moving said air deflector from said stowed position to said operative position and vice versa.

8. The windshield washer system defined in claim 7 wherein said means for pivotally moving said air deflector from said stowed position to said operative position and vice versa includes a surface on said deflector adapted to be engaged by aerodynamic forces of air moving relatively over said hood.

9. The method of causing windshield washer liquid from a vehicle windshield washer spray nozzle to impinge on a selected area of a windshield at high vehicle speeds comprising the steps of projecting said wash liquid at a predetermined area of said windshield and as the speed of said vehicle increases causing a separation vortex to apply a lifting aerodynamic force to said wash liquid as it leaves said nozzle and in which said lifting force is a function of speed of the vehicle.

10. The method defined in claim 9 wherein said separation vortex is produced by positioning a deflection tab on said nozzle.

11. The method defined in claim 10 wherein said defection tab projects from about 6 mm to about 12 mm above said nozzle.

12. The method defined in claim 11 wherein said deflection tab projects about 8 mm above said nozzle.

13. In a windshield washer system wherein a nozzle is mounted on the hood of a vehicle and issues a jet of washer fluid in ambient towards the windshield, said nozzle having a housing, the improvement comprising a tab member on said nozzle housing immediately in advance of where said nozzle issues a jet of washer fluid in ambient, said tab member creating a lifting force on the jet for assuring that said washer fluid impinges on said windshield in a predetermined area thereon at speeds above a predetermined minimum.

14. The windshield washer system defined in claim 13 wherein said nozzle is a fluidic oscillator nozzle which oscillates a jet of washer fluid at a rate sufficient to form washer fluid droplets substantially in a given droplet size range.

15. The windshield washer system defined in claim 13 wherein said fluidic oscillator nozzle includes a molded housing and said tab member molded in a surface of said molded housing.

16. The fluidic windshield washer system defined in claim 13 wherein said tab member is a concave air deflector.

17. The windshield washer system defined in claim 14 wherein said fluidic oscillator includes a molded housing and said tab member includes an air deflector pivotally mounted on said housing for movement from a stowed position to an operative position, and means for pivotally moving said air deflector from said stowed position to said operative position and vice versa.

18. The windshield washer system defined in claim 17 wherein said means for pivotally moving said air deflector from said stowed position to said operative position and vice versa includes a surface on said deflector adapted to be engaged by aerodynamic forces of air moving relatively over said hood.

19. In a windshield washer system wherein a nozzle is mounted on the hood of a vehicle and issues a jet of washer fluid in ambient towards the windshield, said nozzle having a housing, the improvement comprising separation vortex forming surface attached to said nozzle housing for aerodynamically assuring that said washer fluid impinges on said windshield in a predetermined area thereon at speeds above a predetermined minimum.

20. The windshield washer system defined in claim 19 wherein said separation vortex forming surface projects from about 6 mm to about 12 mm above said nozzle housing.

21. The windshield washer system defined in claim 20 wherein said surface projects about 8 mm above said nozzle housing.

22. The windshield washer system defined in claim 19 wherein said nozzle is a fluidic oscillator nozzle which oscillates a jet of washer fluid at a rate sufficient to form washer fluid droplets substantially in a given droplet size range.

23. The windshield washer system defined in claim 22 wherein said fluidic oscillator nozzle includes a molded housing and said separation vortex forming surface is an air deflector molded in a surface of said molded housing.

24. The fluidic windshield washer system defined in claim 23 wherein said surface is a concave air deflector.

\* \* \* \* \*